United States Patent
De Franchis et al.

(10) Patent No.: US 10,672,139 B2
(45) Date of Patent: Jun. 2, 2020

(54) METHOD AND SYSTEM FOR REMOTELY MEASURING THE VOLUME OF LIQUID STORED IN EXTERNAL FLOATING ROOF TANKS

(71) Applicant: KAYRROS, Paris (FR)

(72) Inventors: Carlo De Franchis, Paris (FR); Guillaume Lostis, Paris (FR); Hefdhi Abdennadher, Paris (FR); Pablo Arias, Cachan (FR); Thomas Madaule, Paris (FR); Axel Davy, Paris (FR); Sylvain Calisti, Paris (FR); Jean-Michel Morel, Paris (FR); Raffaele Grompone, Cachan (FR); Gabriele Facciolo, Cachan (FR)

(73) Assignee: KAYRROS, Paris (FR)

( * ) Notice: Subject to any disclaimer, the term of this patent is extended or adjusted under 35 U.S.C. 154(b) by 149 days.

(21) Appl. No.: 15/983,493

(22) Filed: May 18, 2018

(65) Prior Publication Data

US 2018/0336693 A1 Nov. 22, 2018

Related U.S. Application Data

(60) Provisional application No. 62/508,717, filed on May 19, 2017.

(51) Int. Cl.
*G06T 7/62* (2017.01)
*G06K 9/00* (2006.01)
(Continued)

(52) U.S. Cl.
CPC ............ *G06T 7/62* (2017.01); *G06K 9/00637* (2013.01); *G06K 9/3233* (2013.01); *B65D 88/34* (2013.01);
(Continued)

(58) Field of Classification Search
None
See application file for complete search history.

(56) References Cited

U.S. PATENT DOCUMENTS

| 7,664,320 B2 * | 2/2010 | Yoshida | ............ H04N 1/33307 |
| | | | 358/448 |
| 8,473,227 B2 * | 6/2013 | Olson | ..................... G01F 23/00 |
| | | | 702/156 |

(Continued)

OTHER PUBLICATIONS

Huaping Xu, Wei Chen, Bing Sun, Yifei Chen, Chunsheng Li, "Oil tank detection in synthetic aperture radar images based on quasi-circular shadow and highlighting arcs," J. Appl. Rem. Sens. 8(1) 083689 (Jan. 21, 2014) https://doi.org/10.1117/1.JRS.8.083689 (Year: 2014).*

(Continued)

*Primary Examiner* — Andrae S Allison
(74) *Attorney, Agent, or Firm* — Sunit Talapatra; Foley & Lardner LLP

(57) ABSTRACT

A method for measuring a liquid volume and/or corresponding fill rate of floating roof tanks includes selecting an Area Of Interest (AOI) to be monitored at the earth's surface, gathering geographical coordinates of tanks in the AOI, and downloading and pre-processing a time series of SAR reference images covering the AOI. The method includes projecting geographical coordinates of the tanks on the time series of the images to determine pixel coordinates of the tanks, and determining tank dimensions through processing of the images at the pixel coordinates. The method includes downloading and pre-processing at least one new SAR image over the AOI and registering it on top of the reference images, and, for each tank of the AOI, detecting in the new SAR image a bright spot corresponding to the roof of the tank and converting its pixel coordinates into liquid volume and/or fill rate information.

13 Claims, 8 Drawing Sheets

(51) Int. Cl.
G06K 9/32 (2006.01)
B65D 88/34 (2006.01)
(52) U.S. Cl.
CPC ............... *G06T 2207/10016* (2013.01); *G06T 2207/10044* (2013.01); *G06T 2207/10048* (2013.01); *G06T 2207/20104* (2013.01); *G06T 2207/20132* (2013.01); *G06T 2207/20221* (2013.01); *G06T 2207/30184* (2013.01)

(56) References Cited

U.S. PATENT DOCUMENTS

| | | | | |
|---|---|---|---|---|
| 8,842,874 | B1* | 9/2014 | Alphenaar | G06T 7/62 |
| | | | | 382/100 |
| 9,626,729 | B2* | 4/2017 | Phillips | G06Q 10/06311 |
| 9,934,591 | B2* | 4/2018 | Babenko | G06K 9/6255 |
| 10,001,401 | B2* | 6/2018 | Krolak | G01F 25/0061 |
| 10,217,236 | B2* | 2/2019 | Kraft | G06T 7/62 |
| 10,330,512 | B2* | 6/2019 | Gaarder | G01F 1/68 |
| 2012/0281096 | A1* | 11/2012 | Gellaboina | G01F 23/292 |
| | | | | 348/163 |
| 2014/0285375 | A1* | 9/2014 | Crain | G01S 13/885 |
| | | | | 342/25 A |
| 2016/0343124 | A1* | 11/2016 | Sundheimer | G06Q 40/04 |
| 2017/0023394 | A1* | 1/2017 | Akbar | G01F 23/0061 |
| 2017/0294027 | A1 | 10/2017 | Babenko et al. | |

OTHER PUBLICATIONS

R. Guida, A. Iodice and D. Riccio, "Assessment of TerraSAR-X Products with a New Feature Extraction Application: Monitoring of Cylindrical Tanks," in IEEE Transactions on Geoscience and Remote Sensing, vol. 48, No. 2, pp. 930-938, Feb. 2010. (Year: 2010).*

Aster GDEM Validation Team, "Global Digital Elevation Model Version 2—Summary of Validation Results", Aug. 31, 2011, 27 pages.

Byrd et al., "A limited memory algorithm for bound constrained optimization", SIAM Journal of Scientific and Statistical Computing, Sep. 1995, vol. 16, No. 5, pp. 1190-1208.

Curlander, "Location of spaceborne SAR imagery", IEEE Transaction of Geoscience and Remote Sensing, Jul. 1982, vol. GE-20, No. 3, pp. 359-364.

De Zan et al., "TOPSAR: Terrain observation by progressive scans", IEEE Transactions on Geoscience and Remote Sensing, Sep. 2006, vol. 44, No. 9, pp. 2352-2360.

Farr et al., "The shuttle radar topography mission", Reviews of Geophysics, 2007, vol. 45, pp. 1-33.

Galasso et al., "Estimation of tanks roofs height by means of single COSMO-SkyMed images", 2010, 3 pages.

Guida et al., Assessment of TerraSAR-X products with a new feature extraction application: monitoring of cylindrical tanks, IEEE Transactions on Geoscience and Remote Sensing, Feb. 2010, vol. 48, No. 2, pp. 930-938.

Karney, "Transverse Mercator with an accuracy of a few nanometers", Journal of Geodesy, 2011, vol. 85, pp. 475-485.

Moreira et al., "A tutorial on synthetic aperture radar", IEEE Geoscience and Remote Sensing Magazine, Mar. 2013, pp. 6-43.

Rais, "Fast and accurate image registration. Applications to on-board satellite imaging", PhD Thesis, 2016, 260 pages.

* cited by examiner

METHOD AND SYSTEM FOR REMOTELY MEASURING THE VOLUME OF LIQUID STORED IN EXTERNAL FLOATING ROOF TANKS

CROSS-REFERENCE TO RELATED APPLICATIONS

The present application claims priority to U.S. Provisional Application No. 62/508,717, filed May 19, 2017, the entirety of which is hereby incorporated by reference.

BACKGROUND OF THE INVENTION

The invention concerns a method and device for remotely measuring the volume of liquid stored in external floating roof tanks and/or the corresponding fill rate in an automatic way.

Most of crude oil and petroleum products are stored in external tanks between production and consumption.

The global and local levels of storage are key indicators of the petroleum markets as they strongly reflect the demand/supply balance.

However, most regions in the world do not publish official storage figures or do so infrequently and with some lag.

There is therefore a great value in having near real-time independent measurements of storage tanks all over the world.

Existing techniques to remotely measure the volume of liquid stored in external floating roof tanks rely on photographic or infrared images taken by aerial devices [Alphenaar 2014, Babenko 2017]. These techniques are not applicable in the presence of clouds or at night.

Some authors [Galasso 2010, Guida 2010] proposed an algorithm to estimate the parameters (diameter, top height, roof height) of a floating roof tank in radar images by using a radiometric method based on a radar scattering model. In their algorithm, the tanks parameters are derived from the signal intensity of some particular points in the radar image.

The detection of these particular points in the radar image is a prerequisite which is not addressed by their algorithm.

SUMMARY OF THE INVENTION

An aim of the invention is to propose an automatic method and system which provide storage volume information for external floating roof tanks.

Another aim is to provide such a solution which automatically updates storage volumes and/or fill rates of tracked storage locations.

Another aim is to propose an automatic method and system which provide storage volume information for locations where no data is currently available.

Another aim also is to propose an automatic method and system which provide storage volume information ahead of official reports.

Another aim of the invention is to propose an automatic method and system which use images, which can be acquired even with clouds or at night.

Another aim of the invention is to propose an automatic method and system for remotely measuring the volume of liquid stored in external floating roof tanks which use Synthetic Aperture Radar (SAR).

Another aim is to propose a solution with a geometric method that automatically locates the tanks in the radar images and derives their volumes from the relative positions of some particular points.

Another aim of the invention is to propose an automatic method and system for remotely measuring the volume of liquid stored in external floating roof tanks which is adapted for low resolution, medium resolution and high resolution images.

According to one aspect of the invention, there is provided a method for measuring the volume of floating roof tanks comprising:
- a step of selecting an Area Of Interest (AOI) that will be monitored at the surface of the earth,
- a step of gathering the geographical coordinates of the floating roof tanks in the AOI,
- downloading and pre-processing a time series of SAR reference images covering the AOI,
- projecting the geographical coordinates of the floating roof tanks on said time series of SAR reference images to determine pixel coordinates of the floating roof tanks in said images,
- determining the dimensions of said floating roof tanks through processing of the SAR reference images at said pixel coordinates,
- downloading and pre-processing at least one new SAR image over the AOI and registering it on top of the SAR reference images, and
- for each floating roof tank of the AOI, detecting in the new SAR image a bright spot corresponding to the floating roof of said tank and converting its pixel coordinates into a liquid volume information.

According to other aspects, the method proposed comprises the following features alone or in combination:
- an iterative process is run to refine the geographical coordinates and dimensions of the floating roof tanks, when determining the pixel coordinates of the floating roof tanks in the SAR reference images;
- the detection of a bright spot in the new SAR image is performed by detecting said spot in an image window determined using the tank geographical coordinates and dimensions;
- the liquid volume information is determined from the height of the floating roof, said height of the floating roof being computed as a function of the bright spot position;
- the height of the floating roof is computed as a function of the distance between the bright spot position and its position when the tank is empty;
- a de-bursting and/or a cropping of a SAR image is performed during a pre-processing step;
- the SAR images are satellite SAR images;
- optical images are processed to identify the floating roof tanks of the AOI and to determine their geographical coordinates;
- optical images are processed to determine the diameters of the floating roof tanks of the AOI, said diameters being refined by processing of the SAR reference images;
- optical images are initially processed to compute the boundaries of an AOI as a polygon containing a set of neighboring tanks that can be seen on optical images;
- the geographical coordinates include latitude, longitude and altitude information, and wherein the altitude information is extracted from a digital elevation model database.

According to another aspect of the invention, a corresponding system is also proposed.

DETAILED DESCRIPTION OF THE INVENTION

Floating Roof Tank

Figure 1:
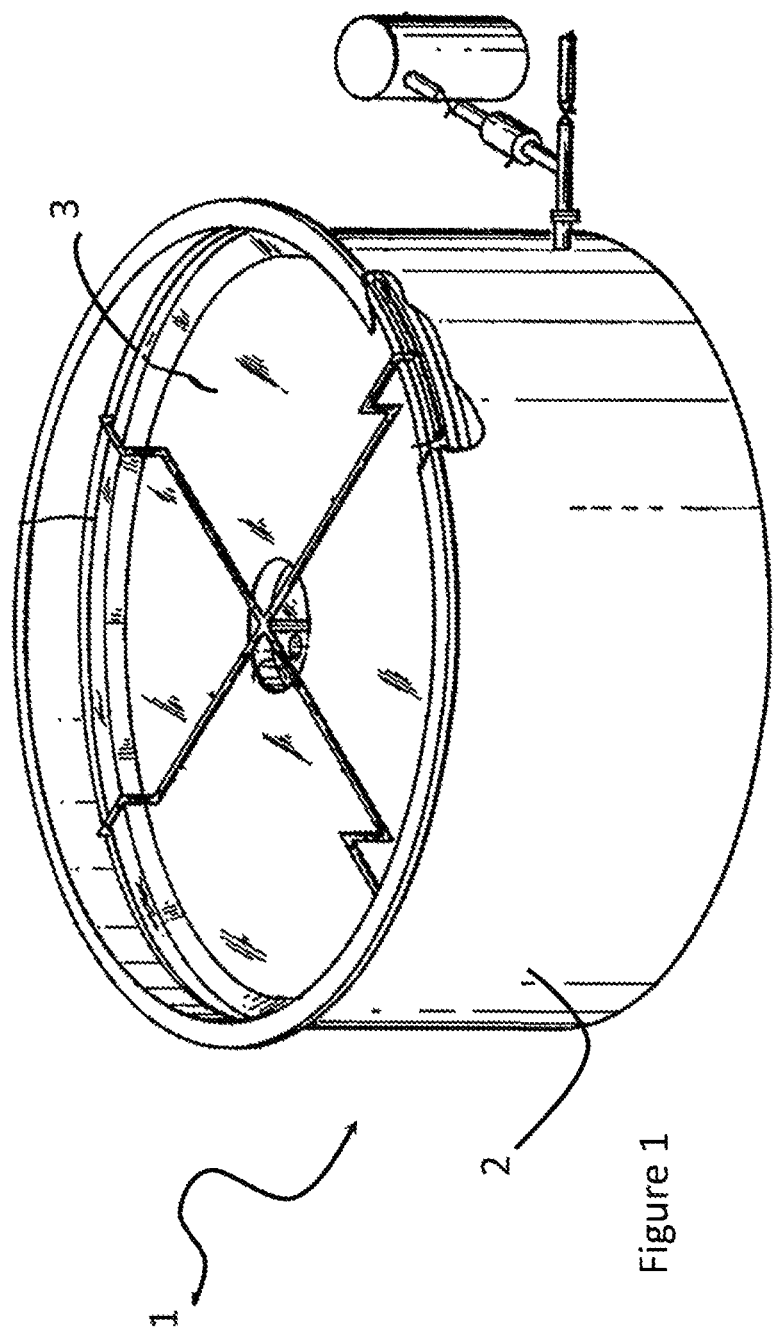
FIG. 1 illustrates a general view of a tank with an external floating roof tank.

An example of an external floating roof tank 1 is shown in FIG. 1.

Such a tank comprises a cylindrical wall 2 defining its internal volume and a floating roof 3.

This floating roof 3 floats freely on top of the liquid comprised within tank 1, and therefore rises and falls as tank 1 is filled and emptied.

Remote Measuring of the Volume of Liquid Stored—General

Figure 2:
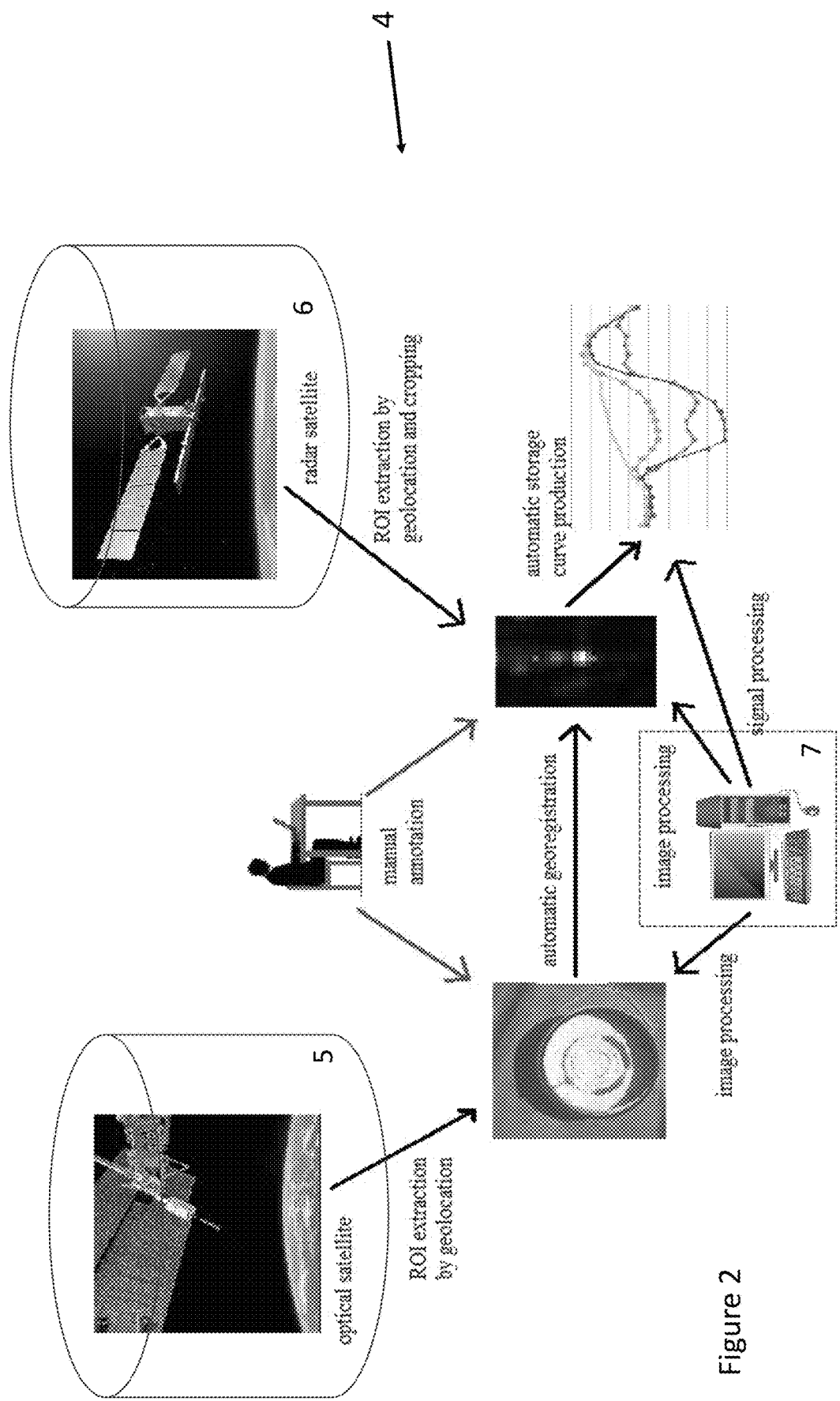
FIG. 2 illustrates an example of the general architecture of a system 4 which can be used.

An example of the general architecture of a system 4 which can be used is illustrated on FIG. 2.

The system 4 uses remotely acquired optical and radar (SAR) images.

These remotely acquired images can be images obtained from any aerial imaging device: satellite, airplane, drone, or other aerial configured imaging systems, capable of capturing images.

These images are for example optical images from World-View-1/2/3/4, GeoEye, QuickBird, Pléiades-1A/B, Spot-6/7, Kompsat-3/3A, RapidEye, Planet Doves, Planet SkySats, Sentinel-2, Landsat-7/8 and radar images from TerraSAR-X/TanDEM-X, COSMO-SkyMed, RadarSat-1/2, Kompsat-5, Alos-2, Sentinel-1, Capella, IceEye or UmbraLabs (databases 5 and 6 on FIG. 2). Other optical or SAR images satellites can be contemplated.

The method proposed is adapted for low resolution images (coarser than 10 m per pixel), medium resolution images (1 to 10 m per pixel) and high resolution images (finer than 1 m per pixel).

It starts with the definition of an Area of Interest (AOI) that is to be monitored in a given pre-identified geographical region (port terminal, storage facility, refinery, etc. . . . ).

Figure 8:
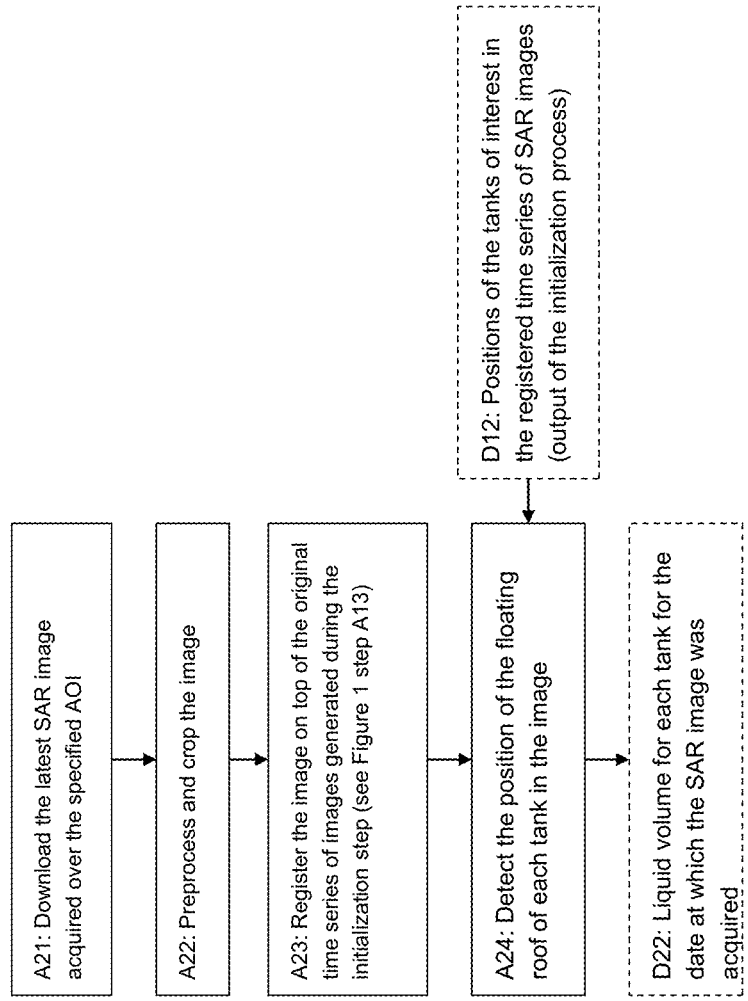
FIG. 8 is a flowchart showing the steps to compute the liquid volume and/or fill rate in each tank when using a new SAR image covering the AOI; dash-circled blocks numbered "D1X" represent data, while line-circled blocks numbered "A1X" represent actions.

It then implies two main sub-processes: an initialization process (FIG. 3), and a routine process (FIG. 8).

The initialization process mainly comprises: 1) downloading and pre-processing a time series of images covering the AOI that will be used as references against which future images will be registered, and 2) projecting the tanks on the time series of radar images and store the coordinates and tank dimensions that will be used to locate the tanks in future images.

The routine process mainly comprises: 1) downloading and pre-processing a new radar acquisition over the AOI and registering it on top of the reference images generated during the initialization process, and 2) using the stored tank coordinates and dimensions to locate the tank in the new image, detect the position of its roof, and convert it to a liquid volume.

Both subprocesses can be performed through image processing software running on computer tools (tools 7 on FIG. 2).

These computer tools can be as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment. They can be of various types: servers, personal computers, tablets, etc. . . . . . The term "computer tool" shall be understood to include any collection of machines that individually or jointly execute instructions though at least a processor.

Both subprocesses can also imply manual analysis as a complement.

The output of the routine process is a collection of storage volume data and corresponding fill rates provided for individual tanks that can be aggregated over given geographical areas. These storage volume data can be stored in memories of the system or on any storage unit available adapted to communicate with the system.

The format of these data can be processed to be adapted for transmission to clients, for example though automatic embedment in a report document with a given file format.

They can also be output to any interface driver for example for displaying on a computer screen or for paper printing.

Figure 3:
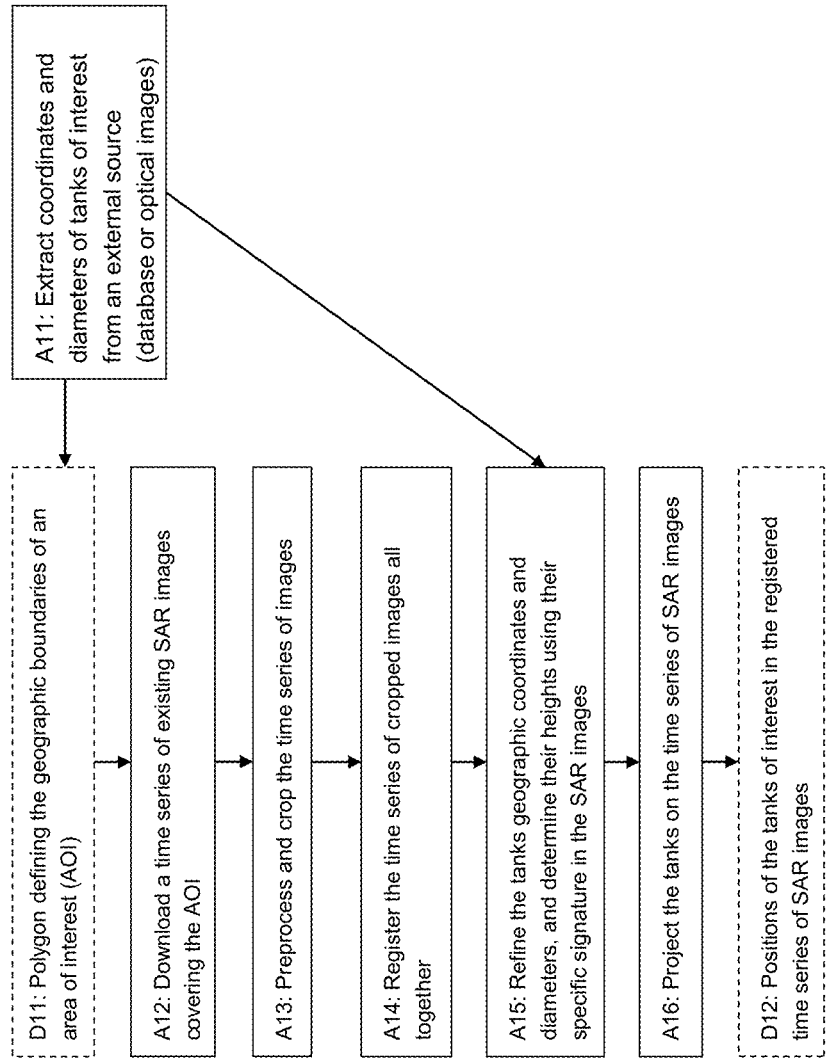
FIG. 3 is a flowchart showing the steps to initialize the process on a new AOI; dash-circled blocks numbered "D1X" represent data, while line-circled blocks numbered "A1X" represent actions.

Initialization Process (FIG. 3)

In a first step A11, a computing tool extracts, from an external source (optical images or external database), coordinates and dimensions of tanks of interest located in a predetermined geographical region.

Such tanks are often located in storage terminals that include fixed-roof as well as floating-roof tanks.

In this step, the computing tool detects on the images all external floating-roof tanks in a given area.

This is for example performed through analysis of optical images through a machine learning algorithm.

The computing tool further outputs the longitude and latitude of the centers of the tanks of interest, as well as their dimensions (including their diameters when the tank are cylindrical). This can be performed through computation performed by manual or automatic analysis of data associated to the optical images or by using an external source of data such as a storage terminal database.

The data thus obtained from step A11 are used to compute the boundaries of the Area of Interest (AOI). Such boundaries of the area of interest are for example computed as a polygon containing a set of neighboring tanks that can be seen on a single SAR image. The vertices of an AOI are identified by their geographic (longitude, latitude) coordinates. The tanks detected in step A11 are grouped in small AOI about 1 km wide. Each AOI is defined as a minimal polygon containing a given set of tanks. One can use for instance an approximation of the convex hull of the set of tanks.

These boundaries of the AOI are input data for step A12 and following.

In step A12, a time series of existing radar images covering the AOI is downloaded. By way of example, when the initialization process is launched on a new AOI, the device uses the Application Programming Interface (API) of the available remote sensing SAR image providers to programmatically search and download a time series of SAR images covering the AOI. The raw images are then stored and made available for internal use on a cloud storage service.

In a further step A13, the time series of images are preprocessed and cropped. Remote sensing SAR images usually cover areas much larger than the AOI. It is thus necessary to find the part of the image that contains the AOI. The position of the AOI in the SAR image is computed thanks to the knowledge of the radar positions over time listed in the image metadata. Knowing the radar positions during the image acquisition, the computing tool converts the geographic coordinates (longitude, latitude, altitude) of a 3D point into the pixel coordinates (x, y) of its position in the SAR image [Curlander 1982] (conversion processing usually known as projection, localization or geocoding).

The altitude required for projecting geographic coordinates into the SAR image is retrieved by the computing tool from a Digital Surface Model (DSM) covering the AOI. Global DSMs such as SRTM [Farr 2007] and ASTER [Aster 2011], or local custom DSMs obtained by any other mean (e.g. Lidar acquisition, stereo reconstruction) can be used.

Once the position of the AOI in the SAR image is computed, a rectangular crop containing the AOI is extracted. Typical dimensions of the crop range from 100× 100 to 10000×10000 pixels, depending on the AOI dimensions and the radar resolutions.

Remote sensing SAR instruments can operate in various modes, such as Spotlight, Stripmap, ScanSAR [Moreira 2013] and TOPSAR [De Zan 2006]. If the acquisition mode is ScanSAR or TOPSAR, then the SAR image subset containing the AOI may be made of two or more consecutive image stripes that need to be stitched (i.e. merged) before cropping. These image stripes are called bursts and the process of stitching the bursts is called de-bursting [De Zan 2006].

A radar works by emitting an electromagnetic wave and measuring its reflected echoes [Curlander 1991]. The amplitude and phase of the received echoes are stored in each pixel as a complex number made of a real and an imaginary part. Some image providers distribute only amplitude images. In these images, each pixel contains only the amplitude of the signal. Other image providers distribute complex images. In these images, each pixel contains a real part x and an imaginary part y. The amplitude can be obtained by computing the module $\sqrt{x^2+y^2}$ of the signal, pixel per pixel. The procedure of computing the amplitudes (i.e. the modules) of the pixels of a complex SAR image is called detection [Curlander 1991]. The last operation of our preprocessing step A13 consists in computing the amplitude of the SAR image crop pixel per pixel if the SAR image was provided as a complex image.

The whole step A13 acts on a single image. It has to be applied to each image obtained from A12. All images are processed independently.

In step A14, the time series of cropped images are registered all together.

The images of the time series need to be accurately registered so that a tank has the same image coordinates in all the images of the time series. Image registration can be performed using any standard image registration algorithm such as, but not limited to, minimizing the sum of squared differences, maximizing the cross-correlation, or maximizing the phase correlation. The process can be accelerated with a multiscale implementation [Szeliski 2011, Rais 2016].

This step acts on an entire time series of images. All the images are processed together. The typical number of images is 20 (but this depends on the number of available SAR images of the AOI).

In step A15, the computing tool refines the tanks geographic coordinates and dimensions by using the tanks specific signature in the SAR images.

To this end, for example, the computing tool uses a description in which each tank is described by the position of its base center, plus its diameter and height. The tank position is a triplet of longitude $\lambda$, latitude $\theta$ and altitude z.
Longitude and Latitude.

The longitudes and latitudes are extracted from an external database or are measured automatically or manually from optical top view images of the AOI (see step A11). They may suffer from some bias due for instance to database errors or to the limited geolocation accuracy of the top view optical image used to detect and measure the tanks. The automatic or manual procedure used to measure the tanks coordinates from optical top view images can be another source of error. The real longitudes and latitudes can be retrieved by estimating and adding an unknown offset to the initial coordinates (see optimization steps as described infra).
Altitude.

If not available from external databases, the altitudes are obtained from a Digital Surface Model (DSM) of the AOI, as discussed in the description of step A13. The DSM might be outdated, especially in places where tanks were built after the DSM computation date, as tank construction often involves terrain flattening. Hence the real altitude of the ground at a tank position may differ from the DSM measured altitude by several meters. This can be a cause of mismatch when projecting geographic coordinates into radar images.
Radius and Height.

If not available from external databases, the radius r of each tank can be estimated by fitting a circle on its top rim in a top view optical image. This can be done manually or automatically. The height h of a tank is the vertical distance between the top and the bottom of the tank. It should not be confused with the altitude z of the ground at the tank position. Typical tank heights range between 10 and 25 meters. If not available from external databases, the height can be measured directly from optical slant view images, or derived from the sunlight shadow in optical images, or measured in the SAR images as explained in the next paragraphs.
Floating Roof Tank Signature in SAR Images.

Floating roof tanks are made of metal thus they strongly reflect radar waves and are easily visible in SAR images. Moreover, a well-known double bounce accumulation [Curlander 1991] occurs at the cylinder base and top points facing the radar. All the radar echoes reflected on the tank wall facing the radar bounce down to the ground and bounce again back to the radar. They all travel the same total distance hence the radar sees them as coming from the same point which appears very bright in the SAR image.

Figure 4:
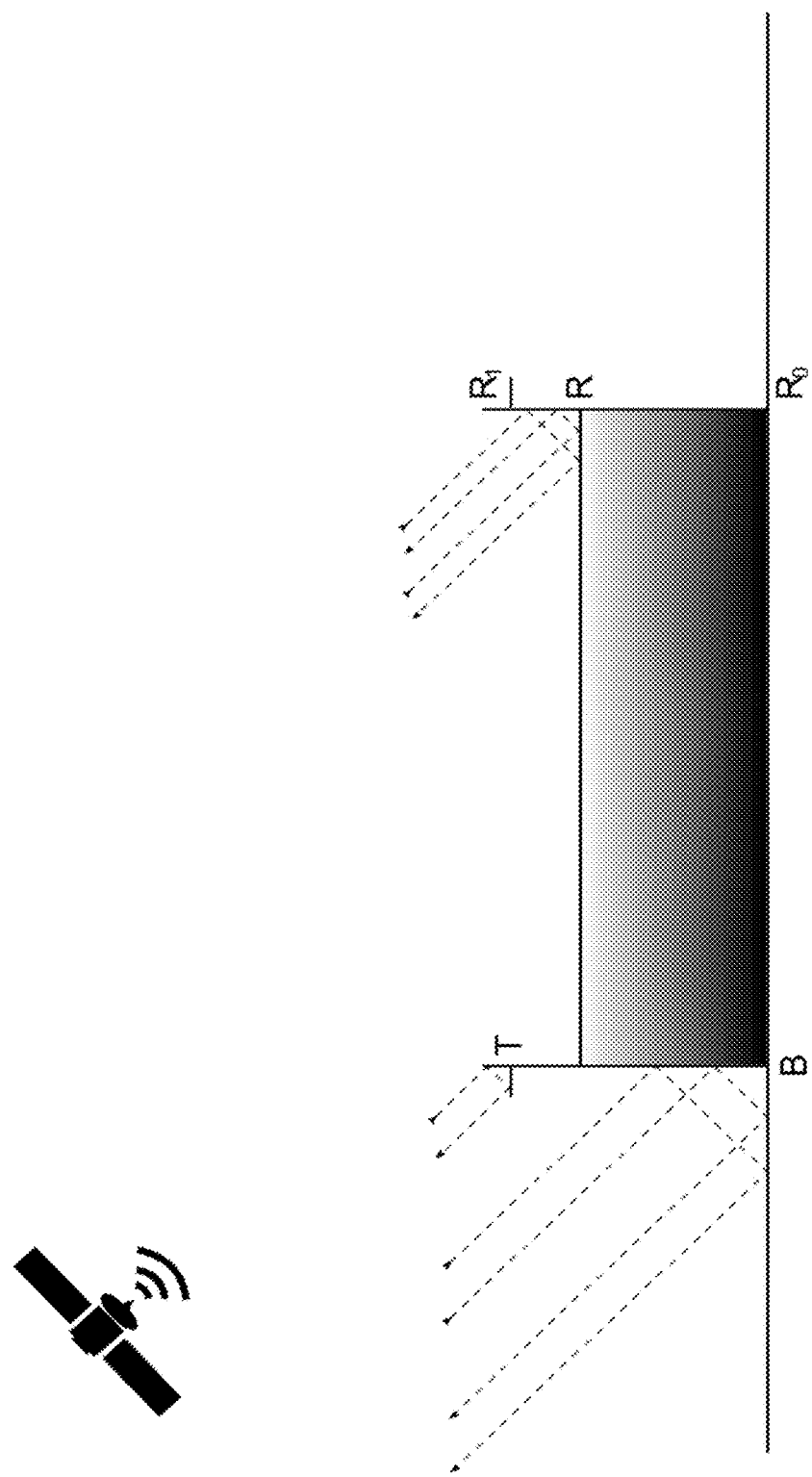
FIG. 4 is a schematic view illustrating reflections of SAR waves by a floating roof tank.

This point is named B, as "Base", in FIG. 4. The same phenomenon occurs for the top rim, as there is usually a metallic walkway around the top that creates an orthogonal intersection with the tank wall. The radar echoes that reflect on the upper part of the tank wall, above the walkway, bounce down to the walkway then bounce again back to the radar. The resulting bright point is named T, as "Top". The same phenomenon happens again on the opposite side of the tank, at the orthogonal intersection formed by the floating roof and the internal face of the tank wall. The resulting bright point is named R, as "Roof". The position of R varies between $R_0$ (tank empty) and $R_1$ (tank full) according to the tank filling rate.

Figure 5:
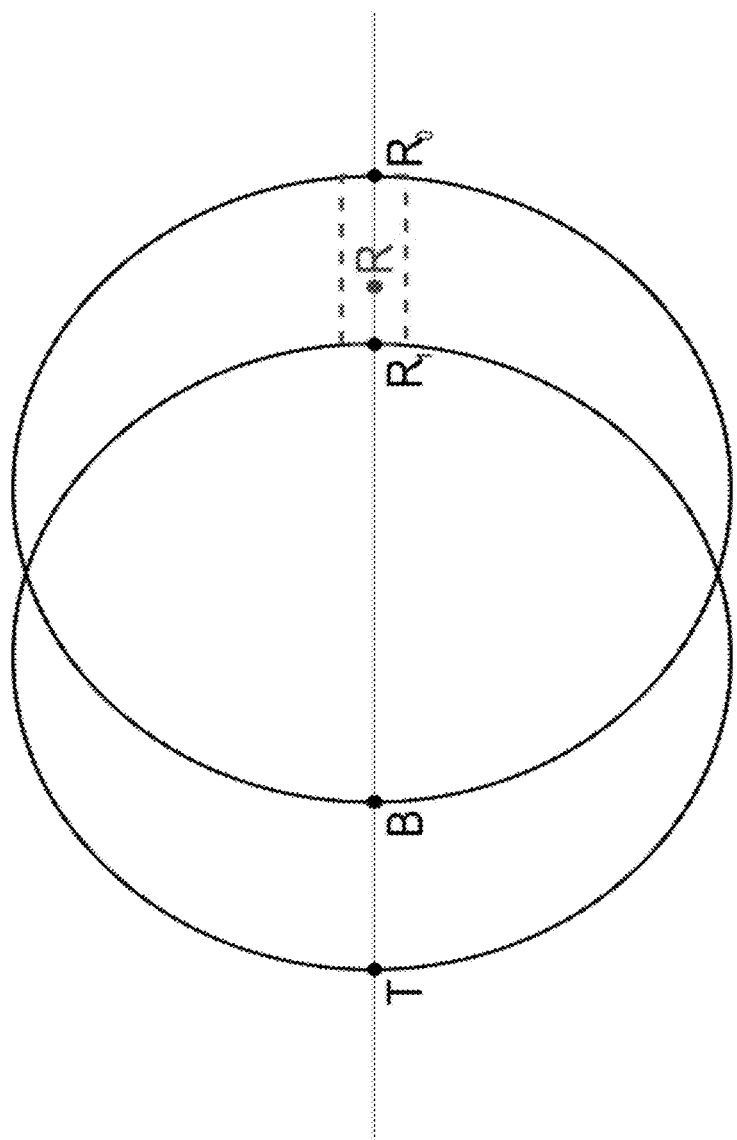
FIG. 5 is a schematic view of a SAR image of the floating roof tank of FIG. 4.

FIG. 5 illustrates the three occurrences of this double bounce phenomenon and shows the three points B, T and R. The tank base and top are seen as bright circles when the horizontal and vertical resolutions are equal. If the horizontal and vertical resolution differ, then the tank base and top rims are seen as ellipses (see for instance in FIG. 7). The position of R varies horizontally in the dashed window between $R_0$ (tank empty) and $R_1$ (tank full) according to the tank filling rate.

Figure 6B:
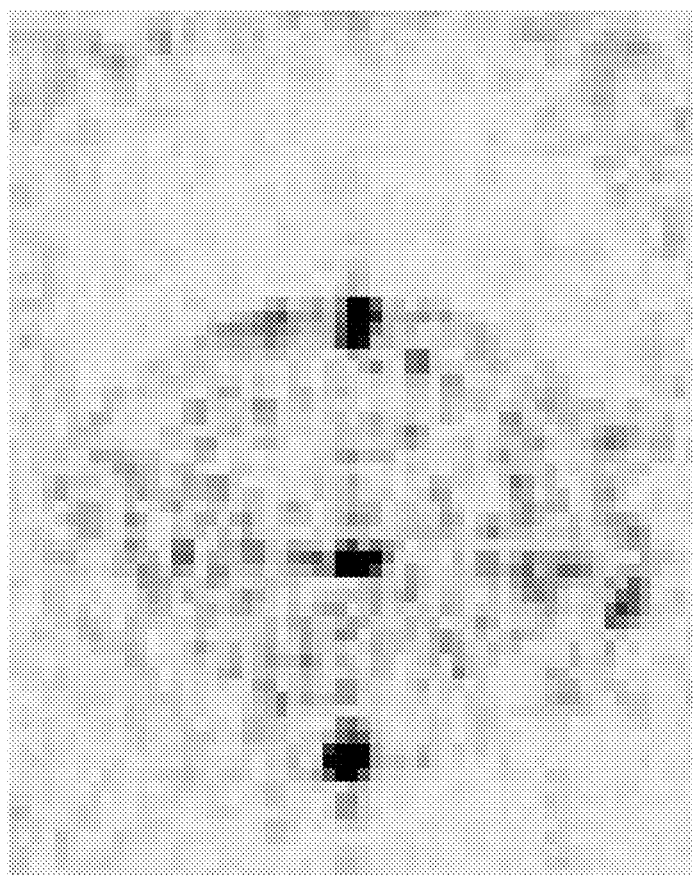
FIGS. 6a and 6b are two COSMO-SkyMed images of a floating roof tank.
Figure 6A:
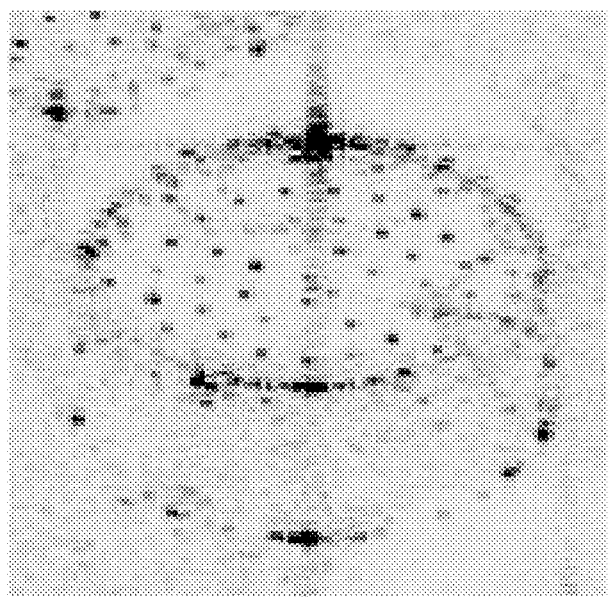

FIGS. 6a and 6b show floating roof tanks in SAR image crops from COSMO-SkyMed where the bright points B, T and R are easily seen FIG. 6a shows a Spotlight amplitude image and FIG. 6b shows a Stripmap amplitude image. The spatial resolution is 1 meter per pixel in Spotlight (left) and 3 meters per pixel in Stripmap (right), in both axis. High amplitude values are represented by black pixels, low amplitude values are represented by white pixels. The three black dots visible in each one of these images correspond, from left to right, to the strong reflections of the tank top rim (point T), the tank base (point B) and the tank floating roof (point R).

Figure 7:
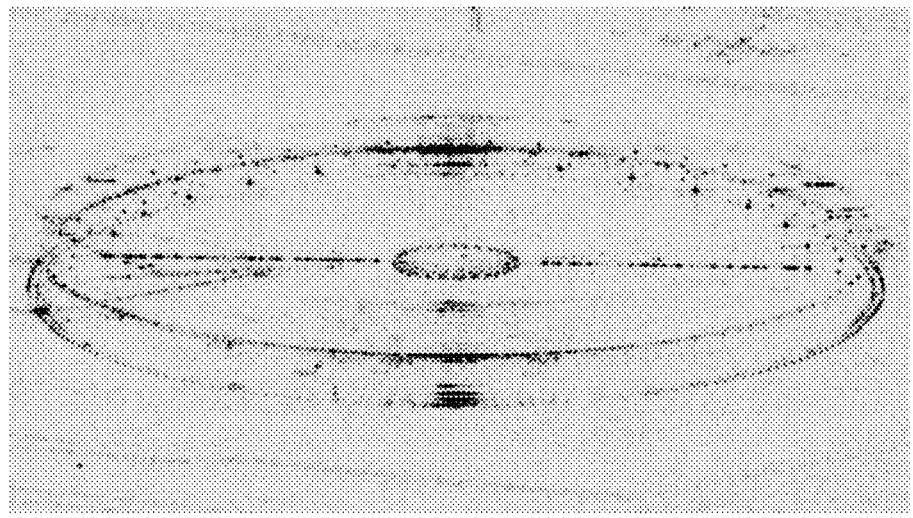
FIG. 7 is a TerraSAR-X Spotlight image of a floating roof tank.

FIG. 7 shows a floating roof tank in a SAR image crop from TerraSAR-X, where the bright points B, T and R are easily seen. The spatial resolution is 23 cm per pixel in the vertical axis and 79 cm per pixel in the horizontal axis. With these resolutions one can see more details, but the three points T, B and R are still the brightest reflections.

Projection function. Given a radar image u, the precise radar positions over time listed in the image metadata allow to define a projection function $P_u$, as was introduced in the description of step A13. This function converts the 3D coordinates λ, θ, z of a world point into the 2D coordinates of its pixel position in image u [Curlander 1982]. For most SAR sensors, such as TerraSAR-X/TanDEM-X, COSMO-SkyMed, RadarSat-1/2, Kompsat-5, Alos-2, Sentinel-1, Capella, IceEye or UmbraLabs, this projection function is accurate up to a fraction of a pixel. It is thus safe to assume that the mismatches we may observe between the projected coordinates of a tank and its actual SAR image signature coordinates come from inaccuracies of the tank geographic coordinates.

Problem formulation. For a given tank, the problem is to refine the longitude λ, latitude θ and altitude z of the tank base as well as the tank height h and radius r, using all the available SAR images of a registered time series (obtained from step A14). For that we maximize the following energy:

$$E(\lambda, \theta, z, r, h) = \sum_{\alpha \in [0, 2\pi]} u(P(\lambda + r\cos\alpha, \theta + r\sin\alpha, z)) + u(P(\lambda + r\cos\alpha, \theta + r\sin\alpha, z + h))$$

where α spans over a regular sampling of [0, 2π]. For the sake of clarity, the longitude λ and latitude θ in the formula above are expressed in meters using for instance a Universal Transverse Mercator (UTM) coordinates system [Karney 2011]. u is the average image, obtained by averaging the images of the time series pixel per pixel. The average image is less noisy than a single SAR image. P is the average projection function. To evaluate P on point (λ,θ,z) one needs to evaluate all the projection functions of the time series on point (λ,θ,z) and then average the resulting series of pixel coordinates. The energy defined above is the sum of the average SAR amplitudes at the projections of points sampled on the tank base and the tank top rim. It should be maximal when the values of λ, θ, z, r, h are such that the projections of the tank base and top rim pass through the bright spots B and T (see FIG. 5).

Optimization. The energy is maximized by using an iterative method. Gradient descent or quasi-Newton methods, such as the BFGS [Byrd 1995] algorithm can be used. λ, θ, z, r, h are initialized with the values extracted from an external database, or from optical images and/or an external DEM (for z), as discussed at the beginning of the description of A15. If no initial estimation of h is available, h is set to a default value between 10 and 25 meters. A bounding box is defined in the 5-dimensional space of parameters around the initial value. The size of this bounding box is selected according to the confidence one has in the initial values, depending on the source of the initial values. The optimization is done tank per tank.

The output of this step is a list of refined tanks coordinates (λ,θ,z) and dimensions (r, h).

Extension to Multiple Viewpoints and Multiple SAR Sensors.

The approach presented here is not limited to a single time series of SAR images. Several time series of SAR images, taken for instance by the same satellite from different relative orbits, or taken by different satellites or planes, can be used to make the problem easier by adding constraints on the optimization. The said energy can be defined for each time series, and the sum of all the energies can be minimized on the same parameters space with the same initialization.

In step A16, the tanks on the time series of radar images are projected.

For each tank of the AOI, its refined coordinates λ, θ,z and dimensions r, h and the average projection function P of the time series are used to compute the image coordinates of points $R_0$ and $R_1$ in the registered time series (see FIG. 5). $R_0$ is the position of the floating roof when the tank is empty and $R_1$ is the position of the floating roof when the tank is full. As the images are registered (thanks to step A14), the pixel coordinates of these points are the same in all the images of the time series.

The output data thus obtained are the positions of the tanks of interest in the registered time series of radar images (output data D12).

For each tank, the pixel coordinates of points $R_0$ and $R_1$ in the registered time series are stored in a database. They are used as an input by the volume calculation routine process described in step A24.

Routine Process (FIG. 8)

Once the initialization process has been run on a new AOI, the device will search for and download the new SAR acquisitions covering the AOI on a regular schedule (once every day for example) (step A21). It relies on the same technology as the one described in step A12.

The preprocessing and crop algorithms described in step A13 are applied to the new SAR image(s) (step A22).

Each image is then registered on top of the original time series of images generated during the initialization (step A23), using the same computing tool as described in step A14.

This ensures that a tank has the same pixel coordinates in all the images of the time series (the initial images and the new images).

In step A24, the computing tool detects the position of the floating roof of each tank in the image.

As explained in the description of step A15, paragraph "Floating roof tank signature in SAR images", floating roof tanks have a specific signature in radar images. The orthogonal intersection of the metallic tank roof with the metallic tank wall is a strong radar reflector and thus appears as a bright spot in the SAR image. The output D12 of the initialization process gives the pixel coordinates of the two extremal positions $R_0$ (tank empty) and $R_1$ (tank full) of the tank roof in the registered SAR time series (see FIG. 5). The computing tool searches the bright spot position R in a window including said two positions $R_0$ and $R_1$.

The actual position of the roof image bright spot R between $R_0$ and $R_1$ is directly linked to its current height $h_R$ in the tank:

$$h_R = \frac{\|R - R_0\|}{\|R_1 - R_0\|} h$$

where h denotes the total tank height computed in A15 when optimizing the energy E. By detecting for each tank the bright spot R between $R_0$ and $R_1$, the computing tool can therefore further compute its current roof height.

The liquid volume for each tank for the date at which the radar image was acquired is then computed and used as output of the processing (output data D22).

Liquid volumes in each tank are computed using the current height $h_R$ of their floating roof and their radius r:

$$V = \pi r^2 h_R$$

The computing tool can also output a fill rate information for the tank:

$$\frac{\|R - R_0\|}{\|R_1 - R_0\|}$$

The output of this step can be the list of tank current volumes and/or fill rates at the date of the input image downloaded in step A21. The tanks volumes may be aggregated per tanks product types if such classification is available, or per tank terminal, per city, country, region, or aggregated over the whole world.

REFERENCES

[Alphenaar 2014] D. Alphenaar, W. Jones. Method and system for determining an amount of a liquid energy commodity stored in a particular location. U.S. Pat. No. 8,842,874 B1, 2014.

[ASTER 2011] ASTER GDEM Validation Team. ASTER Global Digital Elevation Model Version 2—Summary of Validation Results, 2011.

[Babenko 2017] B. Babenko, A. Avtanski, J. Lohn. Remote determination of quantity stored in containers in geographical region. US Patent 2017/0294027 A1, 2017.

[Byrd 1995] R. H. Byrd, P. Lu and J. Nocedal. A Limited Memory Algorithm for Bound Constrained Optimization, SIAM Journal on Scientific and Statistical Computing, vol. 16, no. 5, pp. 1190-1208, 1995.

[Curlander 1982] J. C. Curlander. Location of Spaceborne SAR Imagery. IEEE Transactions on Geoscience and Remote Sensing, no. 3, pp. 359-364, 1982.

[Curlander 1991] J. C. Curlander and R. N. McDonough. Synthetic Aperture Radar: Systems and Signal Processing. Wiley Series in Remote Sensing and Image Processing, 1991.

[De Zan 2006] F. De Zan and A. Monti Guarnieri. TOPSAR: Terrain observation by progressive scans. IEEE Transactions on Geoscience and Remote Sensing, vol. 44, no. 9, pp. 2352-2360, 2006.

[Farr 2007] T. Farr et al. The Shuttle Radar Topography Mission. Reviews of Geophysics, vol. 45, pp. 1-33, 2007.

[Galasso 2010] M. Galasso, S. Serva, D. Riccio and A. Greco. Estimation of tanks roofs height by means of single COSMO-SkyMed images. 2010

[Guida 2010] R. Guida, A. Iodice, D. Riccio. Assessment of TerraSAR-X Products with a New Feature Extraction Application: Monitoring of Cylindrical Tanks. IEEE Transactions on Geoscience and Remote Sensing, vol. 48, no. 2, pp. 930-938, 2010.

[Karney 2011] C. F. F. Karney. Transverse Mercator with an accuracy of a few nanometers. Journal of Geodesy, vol. 85, no. 475, 2011.

[Moreira 2013] A. Moreira, P. Prats-Iraola, M. Younis, G. Krieger, I. Hajnsek, K. Papathanassiou. A Tutorial on Synthetic Aperture Radar. IEEE Geoscience and Remote Sensing Magazine, no. 1, March 2013.

[Rais 2016] M. Rais, Fast and accurate image registration, Applications to on-board satellite imaging. PhD thesis, 2016.

[Szeliski 2011] R. Szeliski. Computer Vision. Springer London, 2011.

The invention claimed is:

1. A method for measuring the liquid volume and/or corresponding fill rate of floating roof tanks comprising:
    a step of selecting an Area Of Interest (AOI) that will be monitored at the surface of the earth,
    a step of gathering the geographical coordinates of the floating roof tanks in the AOI,
    downloading and pre-processing a time series of SAR reference images covering the AOI,
    projecting the geographical coordinates of the floating roof tanks on said time series of Synthetic Aperture Radar (SAR) reference images to determine pixel coordinates of the floating roof tanks in said images,
    determining the dimensions of said floating roof tanks through processing of the SAR reference images at said pixel coordinates,
    downloading and pre-processing at least one new SAR image over the AOI and registering it on top of the SAR reference images, and
    for each floating roof tank of the AOI, detecting in the new SAR image a bright spot corresponding to the floating roof of said tank and converting its pixel coordinates into a liquid volume and/or fill rate information.

2. The method according to claim 1, wherein an iterative process is run to refine the geographical coordinates and dimensions of the floating roof tanks, when determining the pixel coordinates of the floating roof tanks in the SAR reference images.

3. The method according to claim 1, wherein the detection of a bright spot in the new SAR image is performed by detecting said spot in an image window determined using the tank geographical coordinates and dimensions.

4. The method according to claim 1, wherein the liquid volume and/or fill rate information is determined from the height of the floating roof, said height of the floating roof being computed as a function of the bright spot position.

5. The method according to claim 4, wherein the height of the floating roof is computed as a function of the distance between the bright spot position and its position when the tank is empty.

6. The method according to claim 1, wherein a de-bursting and/or a cropping of a SAR image is performed during a pre-processing step.

7. The method according to claim 1, wherein the SAR images are satellite SAR images.

8. The method according to claim 1, wherein optical images are processed to identify the floating roof tanks of the AOI and to determine their geographical coordinates.

9. The method according to claim 1, wherein optical images are processed to determine the diameters of the floating roof tanks of the AOI, said diameters being refined by processing of the SAR reference images.

10. The method according to claim 1, wherein optical images are initially processed to compute the boundaries of an Area Of Interest (AOI) as a polygon containing a set of neighboring tanks that can be seen on optical images.

11. The method according to claim 1, wherein the geographical coordinates include latitude, longitude and altitude information and wherein the altitude information is extracted from a digital elevation model database.

12. The method according to claim 2, wherein the coordinates refinement processing is performed through an iterative method maximizing the following energy:

$$E(\lambda, \theta, z, r, h) = \sum_{\alpha \in [0, 2\pi]} u(P(\lambda + r\cos\alpha, \theta + r\sin\alpha, z) + u(P(\lambda + r\cos\alpha, \theta + r\sin\alpha, z + h))$$

where $\alpha$ spans over a regular sampling of $[0, 2\pi]$ with $\lambda$ longitude of the tank center, $\theta$ latitude of the tank center, z altitude of the center of the bottom of the tank, r radius of the tank, and where u is the average image, obtained by averaging the SAR reference images pixel per pixel, and where P is the average projection function.

13. A system for measuring the volume and/or fill rate of floating-roof tanks comprising at least a computing tool to perform the following steps:

a step of selecting an Area Of Interest (AOI) that will be monitored at the surface of the earth, a step of gathering the geographical coordinates of the floating roof tanks in the AOI, downloading and pre-processing a time series of SAR reference images covering the AOI, projecting the geographical coordinates of the floating roof tanks on said time series of SAR reference images to determine pixel coordinates of the floating roof tanks in said images, determining the dimensions of said floating roof tanks through processing of the SAR reference images at said pixel coordinates, downloading and pre-processing at least one new SAR image over the AOI and registering it on top of the SAR reference images, and for each floating roof tank of the AOI, detecting in the new SAR image a bright spot corresponding to the floating roof of said tank and converting its pixel coordinates into a liquid volume and/or fill rate information.

* * * * *